US012798946B2

(12) United States Patent
Pyne et al.

(10) Patent No.: US 12,798,946 B2
(45) Date of Patent: Nov. 17, 2026

(54) GATE APPARATUS FOR MANUFACTURING FACILITIES

(71) Applicant: Rivian IP Holdings, LLC, Irvine, CA (US)

(72) Inventors: Benjamin Jacob Pyne, Bloomington, IL (US); Fasil Mulatu Kero, Marietta, GA (US)

(73) Assignee: Rivian IP Holdings, LLC, Irvine, CA (US)

( * ) Notice: Subject to any disclaimer, the term of this patent is extended or adjusted under 35 U.S.C. 154(b) by 413 days.

(21) Appl. No.: 18/522,010

(22) Filed: Nov. 28, 2023

(65) Prior Publication Data

US 2025/0171289 A1 May 29, 2025

(51) Int. Cl.
*B66F 11/04* (2006.01)

(52) U.S. Cl.
CPC .................................... *B66F 11/04* (2013.01)

(58) Field of Classification Search
CPC ....................................................... B66F 11/04
See application file for complete search history.

(56) References Cited

U.S. PATENT DOCUMENTS

2024/0151057 A1 * 5/2024 Huang .................... B66B 13/02

FOREIGN PATENT DOCUMENTS

DE 202022101675 U1 * 4/2022 ................ B66F 7/14
JP 06129131 A * 5/1994

OTHER PUBLICATIONS

Machine Translation of JPH 06-129131.*

* cited by examiner

*Primary Examiner* — Diem M Tran
(74) *Attorney, Agent, or Firm* — Patterson + Sheridan, L.L.P.—Rivian

(57) ABSTRACT

The present disclosure relates to gate apparatus, and related lift apparatus and methods, for manufacturing facilities. In one or more embodiments, a lift apparatus includes a walkway and a lift table. The lift apparatus includes a travel block coupled to the lift table. The travel block lifts and lowers with the lift table. The lift apparatus includes a first linkage coupled to the travel block. Lifting of the travel block moves the first linkage in a first direction, and lowering of the travel block moves the first linkage in a second direction that is opposite of the first direction. The lift apparatus includes a movable gate, and a second linkage coupled to the movable gate. Movement of the second linkage in the first direction lowers the movable gate, and movement of the second linkage in the second direction lifts the movable gate at least partially above the walkway.

20 Claims, 7 Drawing Sheets

GATE APPARATUS FOR MANUFACTURING FACILITIES

INTRODUCTION

Vehicle manufacturing and servicing commonly involves transferring components to and from elevated walkways. The boundaries of the elevated walkways can become unobstructed at various times throughout operations, which can cause objects to move past the boundaries from the walkways.

SUMMARY

The present disclosure relates to gate apparatus, and related lift apparatus and methods, for manufacturing facilities.

In one or more embodiments, a lift apparatus includes a platform including a support frame at least partially supporting a walkway, a lift table, and a motor configured to lift and lower the lift table. The lift apparatus includes a travel block coupled to the lift table. The travel block lifts and lowers with the lift table. The lift apparatus includes a first linkage coupled to the travel block. Lifting of the travel block moves the first linkage in a first direction, and lowering of the travel block moves the first linkage in a second direction that is opposite of the first direction. The lift apparatus includes a movable gate, and a second linkage coupled to the movable gate. Movement of the second linkage in the first direction lowers the movable gate, and movement of the second linkage in the second direction lifts the movable gate at least partially above the walkway.

In one or more embodiments, a gate apparatus includes a travel block, a first linkage coupled to the travel block, a movable gate, and a second linkage coupled to the movable gate. The gate apparatus includes one or more actuators disposed between the first linkage and the second linkage to transfer movement between the first linkage and the second linkage.

In one or more embodiments, a gate apparatus includes a travel block, a first roller chain coupled to the travel block, a movable gate, and a second roller chain coupled to the movable gate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to gate apparatus, and related lift apparatus and methods, for manufacturing facilities.

A gate apparatus includes a travel block, a first linkage (e.g. a first chain) coupled to the travel block, a movable gate, and a second linkage (e.g., a second chain) coupled to the movable gate. The gate apparatus includes one or more actuators disposed between the first linkage and the second linkage to transfer movement between the first linkage and the second linkage. Using the movement transferred between the first linkage and the second linkage, the movable gate moves in a second direction when the travel block moves in a first direction. The travel block is coupled to move with a lift table. Hence, the movable gate moves in a direction opposite of the direction in which the lift table moves. As such, the movable gate simultaneously raises to at least partially obstruct a walkway boundary when the lift table is lowered away from the walkway.

The gate apparatus helps to ensure that the walkway boundary is obstructed when a lift table is lowered from the walkway, for example, to prevent an object from moving past the walkway boundary. The gate apparatus is simple in design and function and is relatively inexpensive to produce. The gate apparatus also has a small footprint, which reduces or eliminates interference with work areas.

The disclosure contemplates that terms used herein such as “couples,” “coupling,” “couple,” and “coupled” may include but are not limited to welding, fusing, melting together, embedding, bonding, interference fitting, and/or fastening such as by using bolts, threaded connections, rivets, pins, and/or screws. The disclosure contemplates that terms such as “couples,” “coupling,” “couple,” and “coupled” may include but are not limited to integrally forming. The disclosure contemplates that terms such as “couples,” “coupling,” “couple,” and “coupled” may include but are not limited to direct coupling and/or indirect coupling, such as indirect coupling through components such as links, brackets, blocks, and/or frames.

Figure 1:
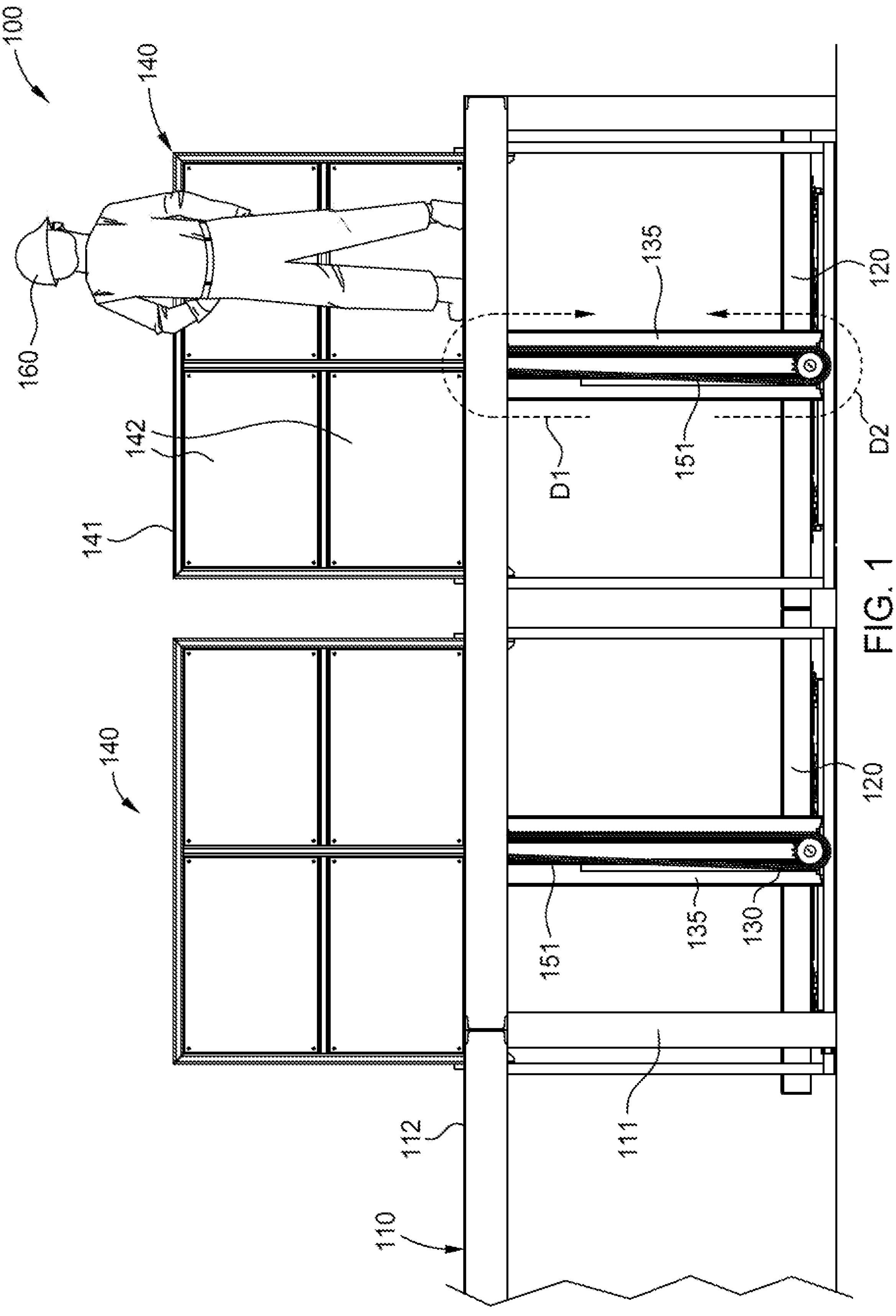
FIG. 1 is a schematic partial back view of a lift apparatus, according to one or more embodiments.

FIG. 1 is a schematic partial back view of a lift apparatus 100, according to one or more embodiments. The lift apparatus 100 includes a platform 110. The platform 110 includes a support frame 111 at least partially supporting a walkway 112. The lift apparatus 100 includes a lift table 120 (two are shown in FIG. 1), and a travel block 130 (two are shown in FIG. 1) coupled to the lift table 120.

The travel block 130 lifts and lowers with the lift table 120. The travel block 130 can include, for example, a bracket coupled to the lift table 120. The lift apparatus 100 includes a movable gate 140 (two are shown in FIG. 1). The movable gate 140 includes a frame 141 (e.g., a metallic frame) and one or more panels 142 (e.g. non-metallic panels) coupled to the frame 141. The frame 141 can include one or more metals such as aluminum or steel, for example. The one or more panels 142 can include polymer(s), such as transparent polymer(s), for example polycarbonate. Other materials are contemplates for the frame 141 and the one or more panels 142. FIG. 1 shows the lift table 120 in a lower position and the movable gate 140 in an upper position. The lift table 120 can be lifted to lift one or more objects 201 (shown in FIG. 2) to a lifted position shown in FIG. 2. A user 160 (e.g., operations personnel) is shown standing on the walkway 112. When the lift table 120 is lifted to the lifted position, the user 160 can move the one or more objects 201 off of the lift table 120 or manufacturing items off of the one or more objects 201 and onto the walkway 112. The one or more objects 201 can include manufacturing item(s) or one or more carriages (such as wheeled cart(s)) that carry the manufacturing item(s). The one or more carriages can be moved over the lift table 120 and lifted using the lift table 120. One or more cover panels 135 can be disposed between the respective lift table 120 and respective linkages 131, 151 described below to reduce interference with the linkages 131, 151. The one or more cover panels 135 are coupled to the support frame 111. The one or more cover panels 135 can be metallic or non-metallic, and/or can include the same material(s) as the one or more panels 142. One or more openings 136 can be between or formed in the one or more cover panels 135, and the travel block 130 can translate in the one or more openings 136.

Figure 2:
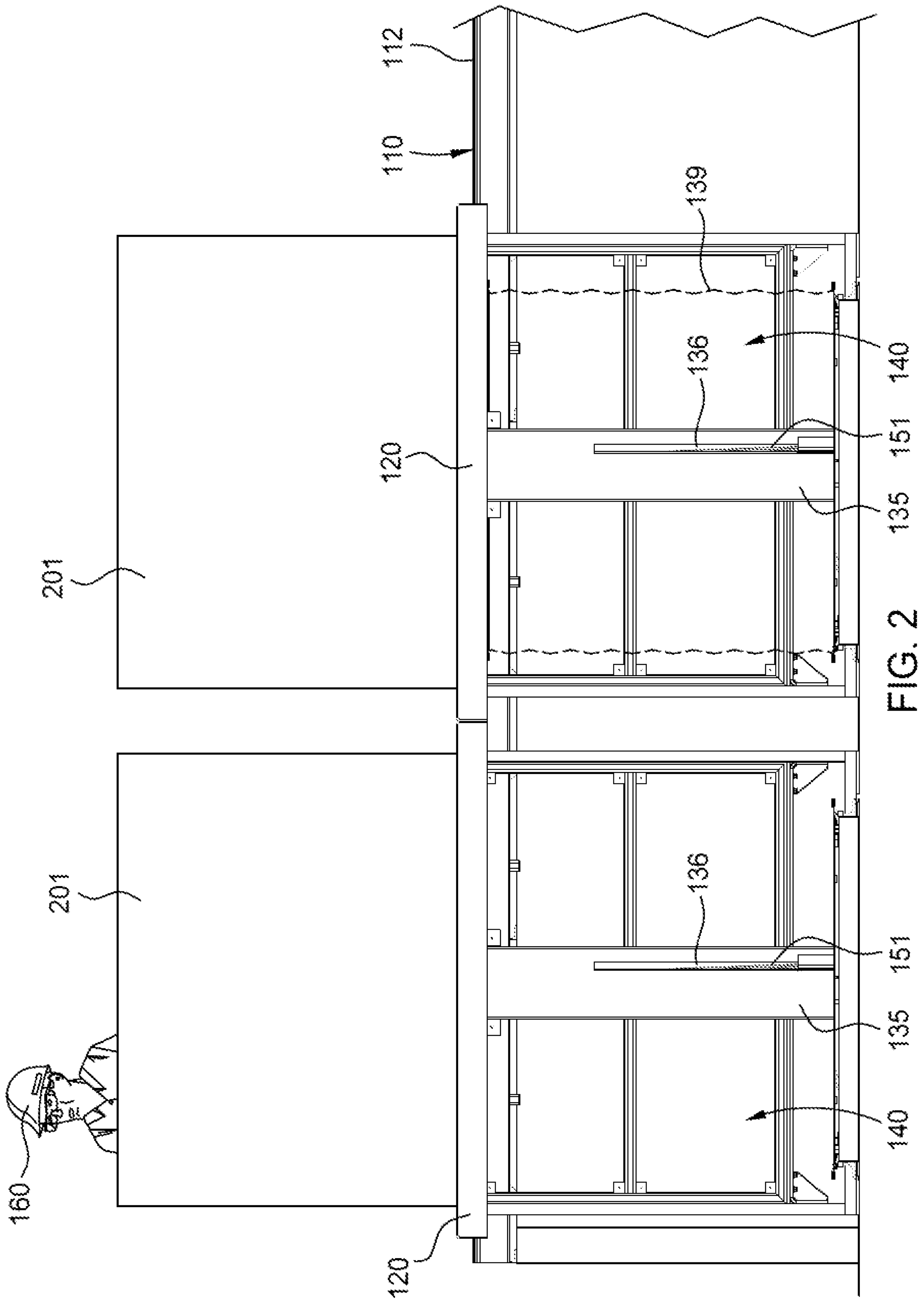
FIG. 2 is a schematic partial front view of the lift apparatus shown in FIG. 1, according to one or more embodiments.

FIG. 2 is a schematic partial front view of the lift apparatus 100 shown in FIG. 1, according to one or more embodiments.

The one or more objects 201 and the lift table 120 are shown in the lifted position. As shown in FIG. 2, the movable gate 140 has lowered to a lower position simultaneously with the lifting of the lift table 120 and the one or more objects 201. A bellows 139 can be coupled to each lift table 120. One bellows 139 is shown in ghost in FIG. 2 for visual clarity purposes.

Figure 3:
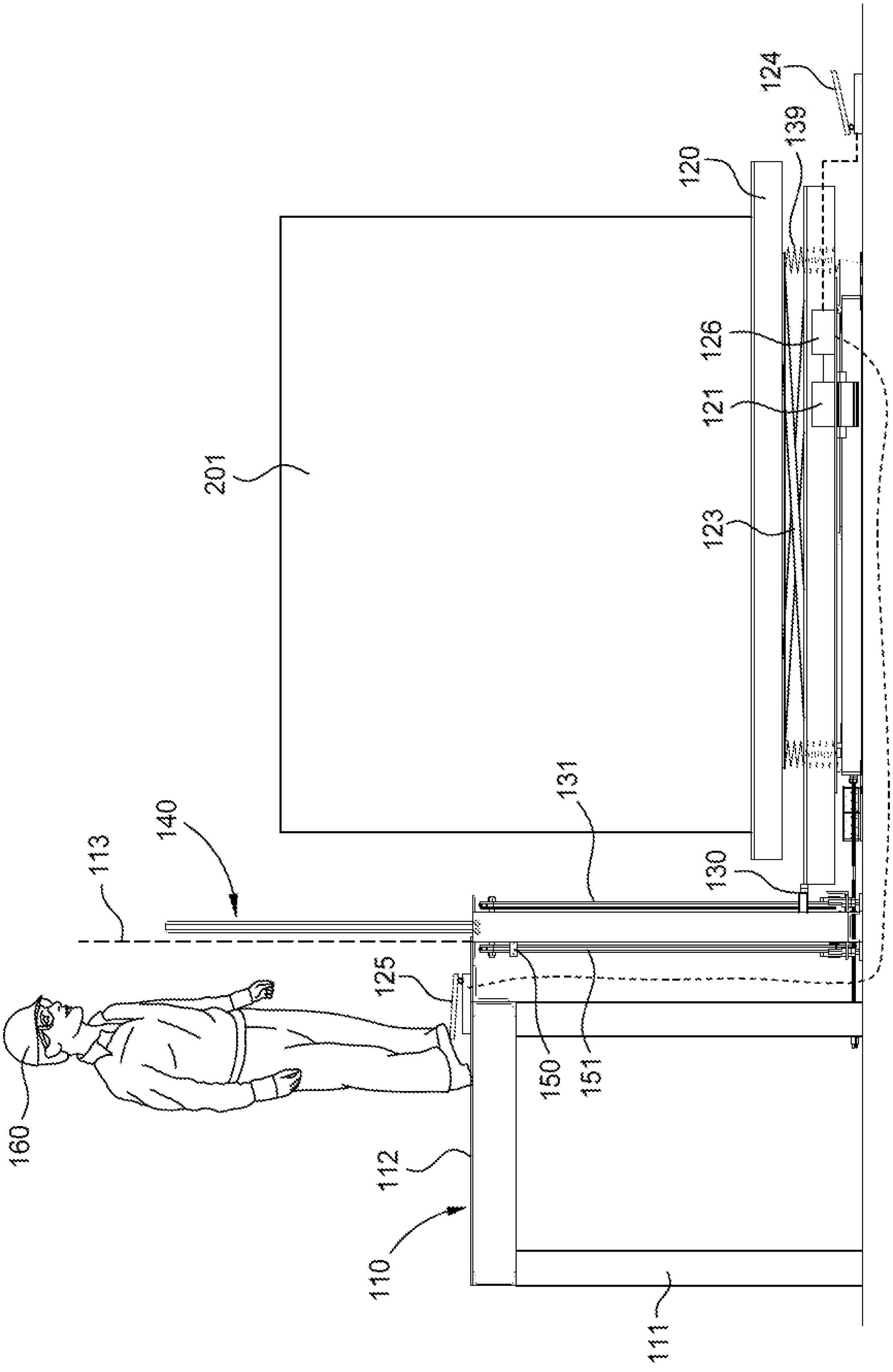
FIG. 3 is a schematic partial side view of the lift apparatus shown in FIGS. 1 and 2, according to one or more embodiments.

FIG. 3 is a schematic partial side view of the lift apparatus 100 shown in FIGS. 1 and 2, according to one or more embodiments.

The lift apparatus 100 includes a motor 121 configured to lift and lower the lift table 120 through an actuation system 123 (such as a scissor lift system). The motor 121 can be, for example, an electric motor such as a servo motor and/or a linear actuator. The lift apparatus 100 includes a first linkage 131 coupled to the travel block 130 and a second linkage 151 coupled to the movable gate 140. One or more user interfaces 124, 125 (two are shown in FIG. 3) are in communication with a controller 126 that is in communication with the motor 121.

A first user interface 124 is disposed off of the walkway 112 and a second user interface 125 is disposed on the walkway 112. In one or more embodiments, the one or more user interfaces 124, 125 include foot petal(s), switch(es), and/or button(s). A user off of the walkway 112 can move the one or more objects 201 above the lift table 120, and the user can manipulate the first user interface 124 to control the motor 121 to drive the actuation system 123 and lift the one or more objects 201 on the lift table 120. As the lift table 120 lifts, the corresponding movable gate 140 moves downwardly to an unobstructed position such that the user 160 on the walkway 112 can move the manufacturing item(s) onto the walkway 112. After the manufacturing item(s) are moved onto the walkway 112, the second user interface 125 can be manipulated by the user 160 to lower the lift table 120 and simultaneously lift the movable gate 140 at least partially past the walkway 112 to at least partially obstruct a boundary 113 of the walkway 112. The present disclosure contemplates that the second user interface 125 can be manipulated to lift the lift table 120 and/or the first user interface 124 can be manipulated to lower the lift table 120.

Figure 4:
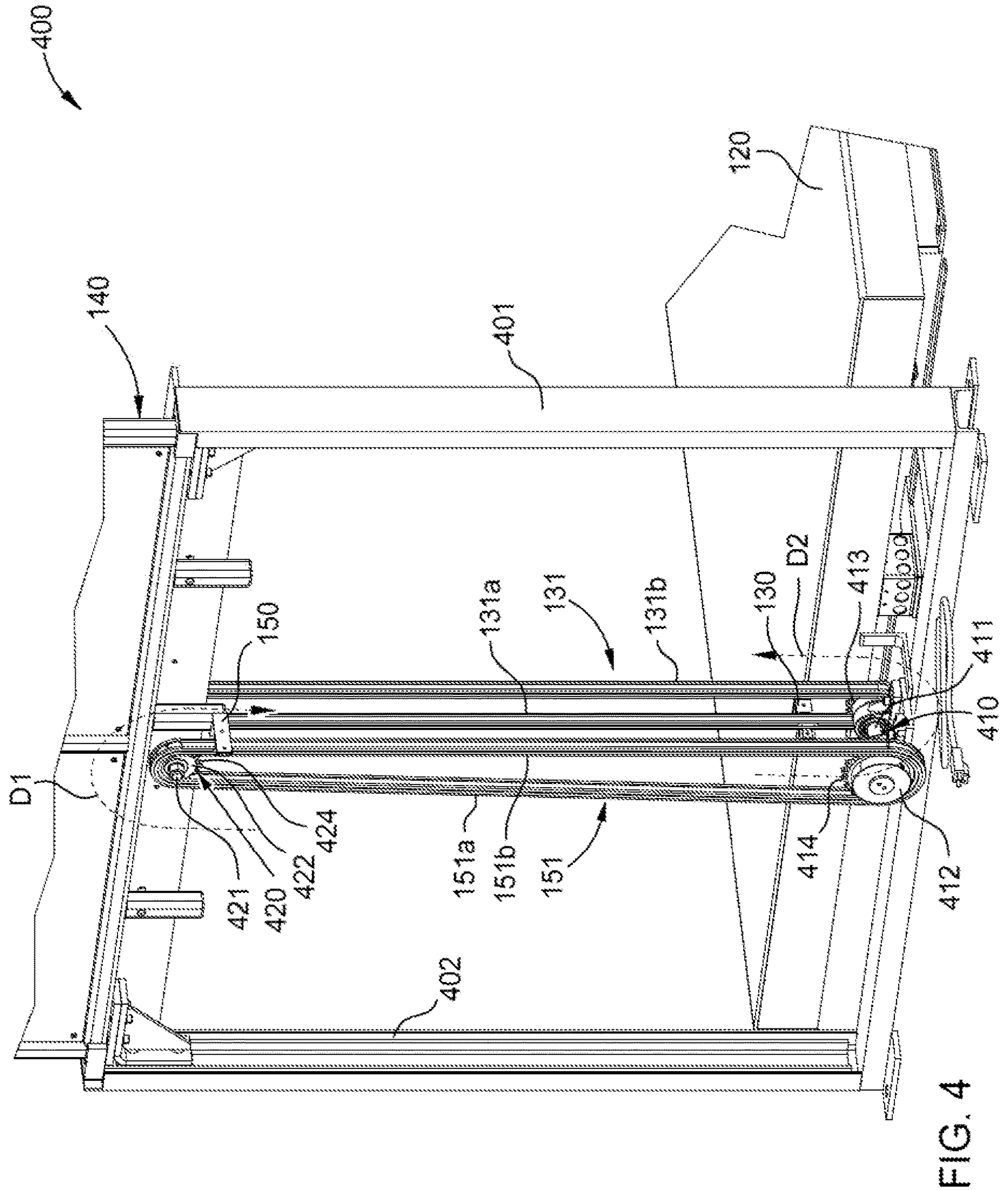
FIG. 4 is a schematic partial perspective back view of a gate apparatus of the lift apparatus shown in FIGS. 1-3, according to one or more embodiments.

FIG. 4 is a schematic partial perspective back view of a gate apparatus 400 of the lift apparatus 100 shown in FIGS. 1-3, according to one or more embodiments.

Lifting (e.g., upwardly) of the travel block 130 moves the first linkage 131 in a first direction D1, and lowering of the travel block 130 moves the first linkage 131 in a second direction D2 that is opposite of the first direction D1. The first linkage 131 is coupled to the lift table 120 through the travel block 130. As described above, the travel block 130 moves with the lift table 120. As such, the travel block 130 moves in response to movement of the lift table 120. Movement of the second linkage 151 in the first direction D1 lowers the movable gate 140, and movement of the second linkage 151 in the second direction D2 lifts the movable gate 140 at least partially above the walkway (as shown for example in FIG. 1). In one or more embodiments, the movable gate 140 is configured to translate upwardly and downwardly within channels 402 of a gate frame 401. The gate frame 401 is part of the support frame 111. The second linkage 151 is coupled to the movable gate 140 through a second travel block 150. The second travel block 150 can be, for example, a bracket.

Figure 5:
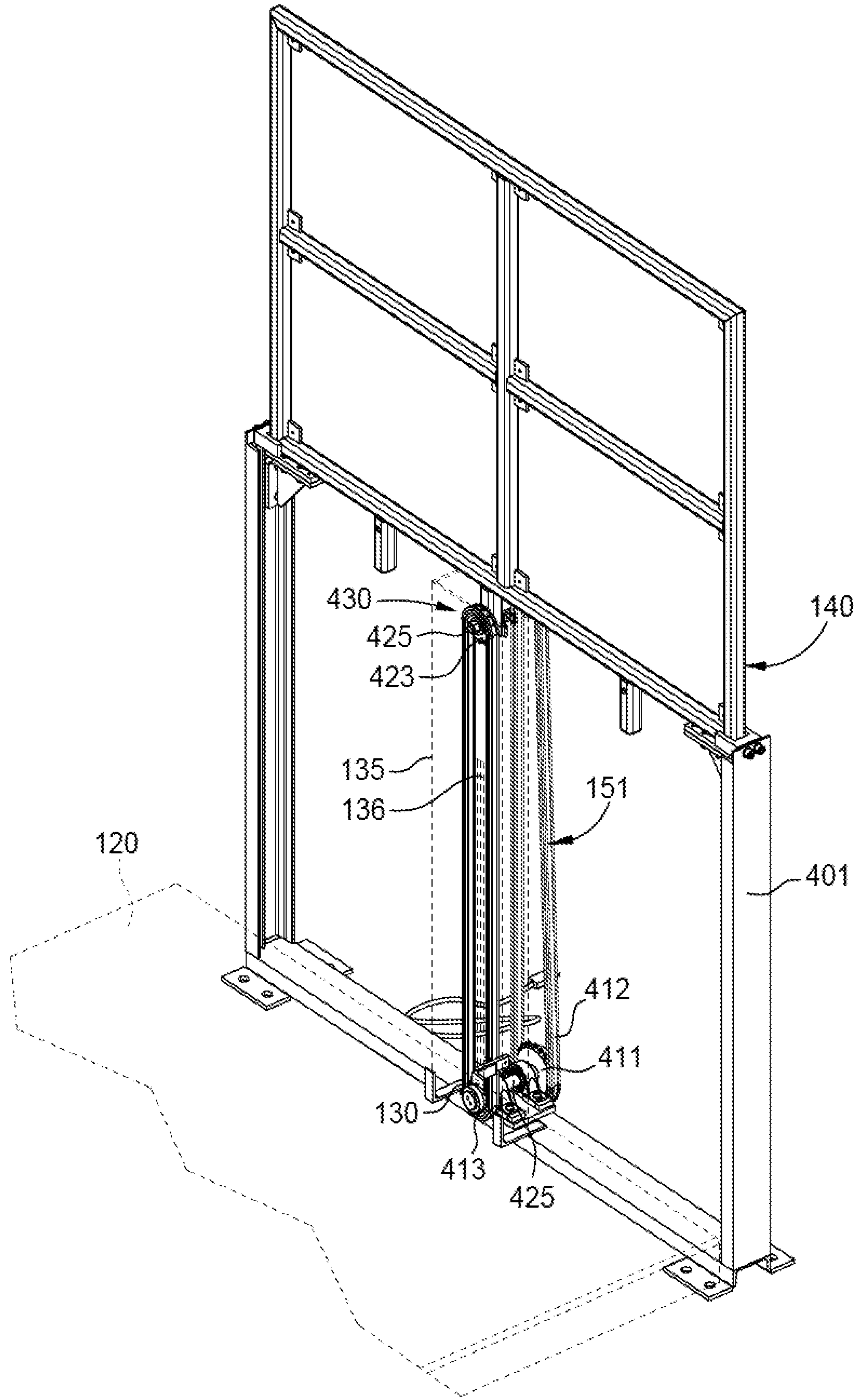
FIG. 5 is a schematic partial perspective front view of the gate apparatus shown in FIG. 4, according to one or more embodiments.
Figure 6:
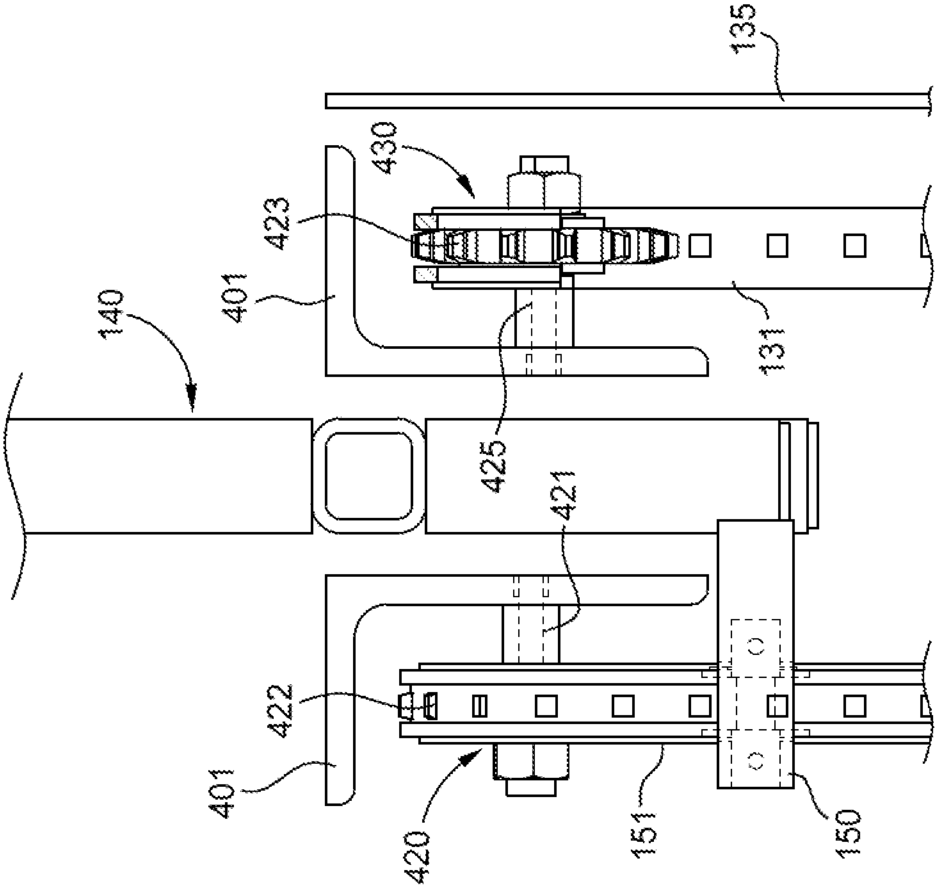
FIG. 6 is a schematic partial side view of the second set of wheels shown in FIGS. 4 and 5, according to one or more embodiments.

The gate apparatus 400 includes one or more actuators 410, 420, 430 (a first actuator 410 and a second actuator 420 are shown in FIG. 4, and a third actuator 430 is shown in FIGS. 5 and 6) disposed between the first linkage 131 and the second linkage 151 to transfer movement between the first linkage 131 and the second linkage 151. The first actuator 410, the second actuator 420, and the third actuator 430 are mounted to the gate frame 401 of the support frame 111. The second actuator 420 and the third actuator 430 are spaced from the first actuator 410. The first actuator 410 includes a first shaft 411 mounted to a lower section of the gate frame 401 of the support frame 111. The second and third actuators 420, 430 respectively include a second shaft 421 and a third shaft 425 (shown in FIGS. 5 and 6) mounted to an upper section of the gate frame 401 of the support frame 111. The movement of the first linkage 131 in the first direction D1 transfers through the one or more actuators 410, 420, 430 to move the second linkage 151 in the first direction D1. In one or more embodiments, the first linkage 131 includes a first chain wound at least partially about the first and third actuators 410, 430, and the second linkage 151 includes a second chain wound at least partially about the first and second actuators 410, 420. In one or more embodiments, the first chain is a first roller chain, and the second chain is a second roller chain. The present disclosure contemplates other structures for the first linkage 131 and the second linkage 151, such as gears, belts, ACME screws, and/or other linkage structures.

The first actuator 410 includes a set of first wheels 412, 413 coupled to the first shaft 411, and the second and third actuators 420, 430 include a set of second wheels 422, 423 coupled respectively to the second shaft 421 and the third shaft 425. The first wheels 412, 413 rotate with the first shaft 411, wheel 422 rotates with rotation of the second shaft 421, and wheel 423 rotates with rotation of the third shaft 425. The set of second wheels 422, 423 are spaced (e.g., vertically) from the set of first wheels 412, 413. In one or more embodiments, the first wheels 412, 413 include first sprockets or first gears that include first teeth 414 configured to interface with the first chain, and the second wheels 422, 423 include second sprockets or second gears that include second teeth 424 configured to interface with the second chain. The first actuator 410, the second actuator 420, and the third actuator 430 are configured to move the second linkage 151, the second travel block 150, and the movable gate 140 at a faster speed than the first linkage 131, the travel block 130, and the lift table 120. In one or more embodiments, one of the first wheels (shown as wheel 413 in FIGS. 4 and 5), and two or more of the second wheels 422, 423 include a first outer diameter, and another of the first wheels (shown as wheel 412 in FIGS. 4 and 5) includes a second outer diameter that is larger than the first outer diameter. Using the larger second outer diameter (relative to the first outer diameter), rotation of the first wheels 412, 413 and the second wheels 422, 423 moves the second linkage 151 (e.g., the second roller chain) at a faster speed than the first linkage 131 (e.g., the first roller chain). In one or more embodiments, the first outer diameter and/or the second diameter are respectively measured along an arcuate body relative to which the respective teeth 414 or 424 extend. In one or more embodiments, the second outer diameter is a ratio of the first outer diameter, and the ratio is at least 1.05, such as within a range of 1.1 to 1.3. In one or more embodiments, the first outer diameter is within a range of 2.0 inches to 4.0 inches. In one or more embodiments, the first outer diameter is within a range of 2.1 inches to 5.2 inches. The present disclosure contemplates that the first outer diameter, the second outer diameter, and/or the ratio can vary depending on parameters, such as the travel distance of the lift table 120 and/or the travel distance of the movable gate 140.

The faster speed of the second linkage 151 facilitates ensuring that the movable gate 140 at least partially blocks the boundary 113 of the walkway 112.

The first linkage 131 (e.g., the first roller chain) is wound at least partially about the one of the first wheels 412, 413 (shown as wheel 413 in FIGS. 4 and 5) and one of the second wheels 422, 423, (shown as wheel 423 in FIG. 5). The second linkage 151 (e.g., the second roller chain) is wound at least partially about the another of the first wheels 412, 413 (shown as wheel 412 in FIGS. 4 and 5) and another of the second wheels 422, 423 (shown as wheel 422 in FIG. 4).

The first linkage 131 includes a first section 131*a* on a first side of the one or more actuators 410, 420, 430, and a second section 131*b* on a second side of the one or more actuators 410, 420, 430. The second linkage 151 includes a first section 151*a* on the first side of the one or more actuators 410, 420, 430, and a second section 151*b* on the second side of the one or more actuators 410, 420, 430. The travel block 130 is coupled to the first section 131*a* of the first linkage 131 that is on the first side of the one or more actuators 410, 420, 430. The movable gate 140 and the second travel block 150 are coupled to the second section 151*b* of the second linkage 151 that is on the second side of the one or more actuators 410, 420, 430.

FIG. 5 is a schematic partial perspective front view of the gate apparatus 400 shown in FIG. 4, according to one or more embodiments.

The lift table 120 and the one or more cover panels 135 are shown in ghost in FIG. 5 for visual clarity purposes.

The present disclosure contemplates that the first linkage 131 or the second linkage 151 can be omitted. For example, the second linkage 151 can be omitted, and the second travel block 150 coupled to the movable gate 140 can be coupled to the second section 131*b* of the first linkage 131. In such an embodiment, the travel block 130 can be coupled to the first section 131*a* of the first linkage 131. In such an embodiment, the wheels 413, 423 can be included, and the wheels 412, 422 can be omitted. In such an embodiment, the travel distance for the lift table 120 can be about equal to the travel distance for the movable gate 140. In such an embodiment, the respective outer diameters of the wheels 413, 423 can be about equal to each other.

FIG. 6 is a schematic partial side view of the second set of wheels 422, 423 shown in FIGS. 4 and 5, according to one or more embodiments. The first linkage 131 is shown as partially sectioned in FIG. 6 for visual clarity purposes.

Figure 7:
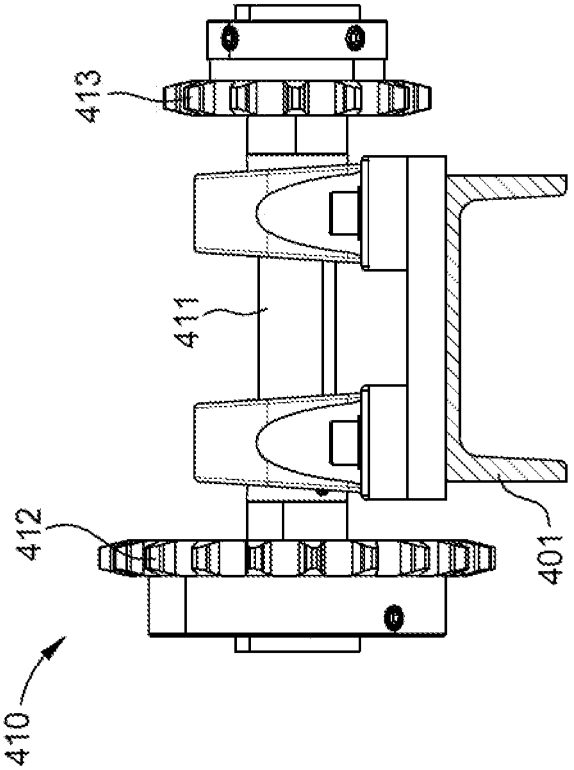
FIG. 7 is a schematic partial side view of the first set of wheels shown in FIGS. 4 and 5, according to one or more embodiments.

FIG. 7 is a schematic partial side view of the first set of wheels 412, 413 shown in FIGS. 4 and 5, according to one or more embodiments.

Cross-sectional hatching is not shown in FIGS. 6 and 7 for visual clarity purposes.

Figure 8:
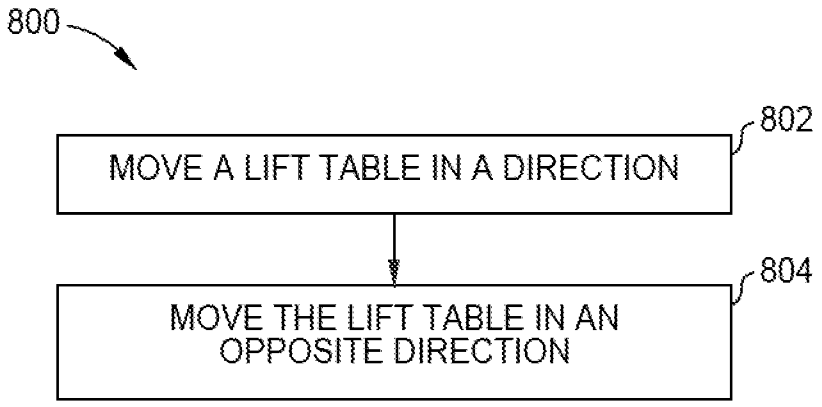
FIG. 8 is a schematic block diagram view of a method of equipment transfer, according to one or more embodiments.

FIG. 8 is a schematic block diagram view of a method 800 of equipment transfer, according to one or more embodiments.

The description of the method 800 includes reference to reference numerals shown in FIGS. 1-4, and the present disclosure contemplates that subject matter (such as structures and components) other than the subject matter shown in FIGS. 1-4 can be used in relation to the method 800.

Operation 802 of the method 800 includes moving the lift table 120 in a direction (e.g., an upward direction). The moving of the lift table 120 drives the first linkage 131 along the first direction D1 shown in FIGS. 1 and 4. The movement of the first linkage 131 transfers through the one or more actuators 410, 420, 430 and drives the second linkage 151 in the first direction D1. The movement of the second linkage 151 drives the movable gate 140 to move the movable gate 140 in an opposite direction (e.g., a downward direction) simultaneously with the movement of the lift table 120. The movement of the movable gate 140 in the opposite direction at least partially disobstructs the boundary 113 of the walkway 112.

Operation 804 of the method 800 includes moving the lift table 120 in the opposite direction (e.g., a downward direction). The moving of the lift table 120 drives the first linkage 131 along the second direction D2 shown in FIGS. 1 and 4. The movement of the first linkage 131 transfers through the one or more actuators 410, 420, 430 and drives the second linkage 151 in the second direction D2. The movement of the second linkage 151 drives the movable gate 140 to move the movable gate 140 in the direction (e.g., an upward direction) simultaneously with the movement of the lift table 120. The movement of the movable gate 140 in the direction at least partially obstructs the boundary 113 of the walkway 112.

Benefits of the present disclosure include reliable and quick obstruction and disobstruction of walkway boundaries; prevention of objections from moving past walkway boundaries; reliable and quick transfer of manufacturing equipment (e.g., to and from elevated walkways); and efficient manufacturing operations (such as vehicle manufacturing operations). The subject matter described herein facilitates the benefits in a manner that is simple, relatively inexpensive, and occupying smaller footprints, which reduces or eliminates interference with work areas.

It is contemplated that one or more aspects disclosed herein may be combined. As an example, one or more aspects, features, components, operations and/or properties of the lift apparatus 100, the movable gate 140, the first linkage 131, the second linkage 151, the first actuator 410, the second actuator 420, the third actuator 430, the wheel 412, the wheel 413, the wheel 422, the wheel 423, the first shaft 411, the second shaft 421, the third shaft 425, the gate apparatus 400, and/or the method 800 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A lift apparatus, comprising:
- a platform comprising a support frame at least partially supporting a walkway;
- a lift table;
- a motor configured to lift and lower the lift table;
- a travel block coupled to the lift table, wherein the travel block lifts and lowers with the lift table;
- a first linkage coupled to the travel block, wherein lifting of the travel block moves the first linkage in a first direction, and lowering of the travel block moves the first linkage in a second direction that is opposite of the first direction;
- a movable gate; and
- a second linkage coupled to the movable gate, wherein movement of the second linkage in the first direction lowers the movable gate, and movement of the second linkage in the second direction lifts the movable gate at least partially above the walkway;
- a first actuator mounted to the support frame; and
- a second actuator mounted to the support frame and spaced from the first actuator, wherein:
  - the first actuator and the second actuator are disposed between the first linkage and the second linkage; and
  - the first actuator and the second actuator are configured to move the second linkage and the movable gate at a faster speed than the first linkage and the travel block.

2. The lift apparatus of claim 1, further comprising:
- a third actuator mounted to the support frame and spaced from the first actuator.

3. The lift apparatus of claim 2, wherein:
- the first actuator comprises a first shaft mounted to a lower section of the support frame;
  - the second actuator comprises a second shaft mounted to an upper section of the support frame; and
  - the third actuator comprises a third shaft mounted to the upper section of the support frame.

4. The lift apparatus of claim 2, wherein the first linkage includes a first roller chain wound at least partially about the first and third actuators, and the second linkage includes a second roller chain wound at least partially about the first and second actuators.

5. The lift apparatus of claim 1, wherein the movement of the first linkage in the first direction transfers through the first actuator to move the second linkage in the first direction.

6. The lift apparatus of claim 1, wherein the lift table is lowerable from an upper position to simultaneously lift the movable gate at least partially past the walkway to at least partially obstruct a boundary of the walkway.

7. The lift apparatus of claim 1, further comprising a cover panel between the lift table on a first side of the cover panel and the first linkage and the second linkage on a second side of the cover panel.

8. The lift apparatus of claim 7, wherein the cover panel comprises an opening, and the travel block is operable to translate in the opening.

9. A gate apparatus, comprising:
- a travel block;
- a first linkage coupled to the travel block;
- a movable gate;
- a second linkage coupled to the movable gate; and
- one or more actuators disposed between the first linkage and the second linkage to transfer movement between the first linkage and the second linkage, the one or more actuators comprising:
  - a set of first wheels coupled to a first shaft, and
  - a set of second wheels coupled respectively to a second shaft and a third shaft,
- wherein:
  - one of the first wheels and two or more of the second wheels include a first outer diameter, and
  - another of the first wheels includes a second outer diameter that is larger than the first outer diameter.

10. The gate apparatus of claim 9, wherein the movable gate comprises a frame and one or more panels coupled to the frame.

11. The gate apparatus of claim 9, wherein the first linkage comprises a first chain, and the second linkage comprises a second chain.

12. The gate apparatus of claim 11, wherein the first wheels comprise first teeth configured to interface with the first chain, and the second wheels comprise second teeth configured to interface with the second chain.

13. The gate apparatus of claim 8, wherein:
- the first linkage comprises:
  - a first section on a first side of the one or more actuators, and
  - a second section on a second side of the one or more actuators; and
- the second linkage comprises:
  - a first section on the first side of the one or more actuators, and
  - a second section on the second side of the one or more actuators.

14. The gate apparatus of claim 13, wherein:
- the travel block is coupled to the first section of the first linkage that is on the first side of the one or more actuators; and
- the movable gate is coupled to the second section of the second linkage that is on the second side of the one or more actuators.

15. The gate apparatus of claim 9, further comprising:
- a lift table coupled to the travel block; and
- a cover panel between the lift table on a first side of the cover panel and the first linkage and the second linkage on a second side of the cover panel.

16. The gate apparatus of claim 15, wherein the cover panel comprises an opening, and the travel block is operable to translate in the opening.

17. The gate apparatus of claim 15, wherein the cover panel comprises an opening, and the travel block extends through the opening between the first linkage and the lift table.

18. The gate apparatus of claim 9, further comprising a lift table coupled to the travel block, wherein the lift table is lowerable from an upper position to simultaneously lift the movable gate to an obstruction position.

19. A gate apparatus, comprising:
- a travel block;
- a first roller chain coupled to the travel block;

a movable gate;

a second roller chain coupled to the movable gate;

a set of first wheels; and a set of second wheels spaced from the set of first wheels, wherein:

the first roller chain is wound at least partially about one of the first wheels and one of the second wheels, the one of the first wheels and two or more of the second wheels include a first outer diameter, the second roller chain is wound at least partially about another of the first wheels and another of the second wheels, the another of the first wheels include a second outer diameter that is larger than the first outer diameter, and rotation of the first wheels and the second wheels moves the second roller chain at a faster speed than the first roller chain.

20. The gate apparatus of claim 19, further comprising:

a first shaft coupled to the first wheels, wherein the first wheels rotate with rotation of the first shaft;

a second shaft coupled to the another of the second wheels, wherein the another of the second wheels rotates with rotation of the second shaft.

* * * * *